US008966561B2

(12) United States Patent
Van Doorn

(10) Patent No.: US 8,966,561 B2
(45) Date of Patent: Feb. 24, 2015

(54) CONTROLLING APPLICATION DEVICES SIMULTANEOUSLY

(75) Inventor: Markus Gerardus Leonardus Maria Van Doorn, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 1311 days.

(21) Appl. No.: 10/500,683

(22) PCT Filed: Dec. 9, 2002

(86) PCT No.: PCT/IB02/05289
§ 371 (c)(1),
(2), (4) Date: Jul. 2, 2004

(87) PCT Pub. No.: WO03/058575
PCT Pub. Date: Jul. 17, 2003

(65) Prior Publication Data
US 2005/0125718 A1 Jun. 9, 2005

(30) Foreign Application Priority Data
Jan. 8, 2002 (EP) .................................... 02075032

(51) Int. Cl.
*H04N 7/173* (2011.01)
*H04N 7/16* (2011.01)
(Continued)

(52) U.S. Cl.
CPC ............... *H04L 67/30* (2013.01); *G08C 17/00* (2013.01); *G08C 2201/31* (2013.01);
(Continued)

(58) Field of Classification Search
USPC ............................................... 725/116, 151
See application file for complete search history.

(56) References Cited

U.S. PATENT DOCUMENTS 5,875,108 A * 2/1999 Hoffberg et al. ................ 700/17
6,076,166 A 6/2000 Moshfeghi
(Continued)

FOREIGN PATENT DOCUMENTS

JP H11224294 A 8/1999
JP 2001290724 A 10/2001
(Continued)

*Primary Examiner* — Pankaj Kumar
*Assistant Examiner* — Franklin Andramuno

(57) ABSTRACT

A method and a system of controlling application devices simultaneously. The application devices can be a Web tablet, a set-top box, a VCR, a TV, and PDA, a lamp, a coffee machine, a radio, a telephone, a background wall, a DVD player or an electronic information panel. The method includes four steps controlled by a server: retrieving first documents (501) from a first set of application devices; retrieving identification (502) of a user; generating (505) second documents, each comprising an instruction, on the basis of at least a part of the retrieved identification of the user and at least a part of the first documents; simultaneously sending (506) at least one of the second documents to each device of a second set of the application devices; and performing (507) for a given device of the second set one instruction from at least one of the second documents received in the given device. The step of retrieving identification by the server includes the steps of retrieving user profile (503) information based on the user identification, and retrieving context profile information (504) relating to present surroundings of the user. The said documents include Hyper Text Markup Language, Scalable Vector Graphics, Resource Description Framework and Extensible Markup Language (XML).

20 Claims, 4 Drawing Sheets

(51) Int. Cl.
*H04L 29/08* (2006.01)
*G08C 17/00* (2006.01)
*H04L 12/28* (2006.01)
*H04L 29/06* (2006.01)
*H04N 21/41* (2011.01)
*H04N 21/436* (2011.01)
*H04N 21/8543* (2011.01)

(52) U.S. Cl.
CPC ....... *G08C 2201/33* (2013.01); *G08C 2201/41* (2013.01); *G08C 2201/42* (2013.01); *G08C 2201/50* (2013.01); *G08C 2201/91* (2013.01); *H04L 12/2803* (2013.01); *H04L 12/2818* (2013.01); *H04L 12/2829* (2013.01); *H04L 29/06* (2013.01); *H04N 21/4131* (2013.01); *H04N 21/43615* (2013.01); *H04N 21/8543* (2013.01); *H04L 69/329* (2013.01)
USPC .......................................... 725/116; 725/151

(56) References Cited

U.S. PATENT DOCUMENTS

| | | | | |
|---|---|---|---|---|
| 6,198,479 | B1 * | 3/2001 | Humpleman et al. | 715/733 |
| 6,202,023 | B1 | 3/2001 | Hancock et al. | |
| 6,218,931 | B1 * | 4/2001 | Asghar et al. | 370/479 |
| 6,513,006 | B2 * | 1/2003 | Howard et al. | 704/257 |
| 6,615,088 | B1 * | 9/2003 | Myer et al. | 700/20 |
| 6,623,427 | B2 * | 9/2003 | Mandigo | 600/300 |
| 6,868,292 | B2 * | 3/2005 | Ficco et al. | 700/19 |
| 6,988,070 | B2 * | 1/2006 | Kawasaki et al. | 704/275 |
| 7,200,683 | B1 * | 4/2007 | Wang et al. | 709/250 |
| 2002/0069063 | A1 * | 6/2002 | Buchner et al. | 704/270 |
| 2003/0084047 | A1 * | 5/2003 | Williamson | 707/10 |

FOREIGN PATENT DOCUMENTS

WO    WO 00/39964 A1    7/2000
WO    WO 00/60488 A2    10/2000

* cited by examiner

CONTROLLING APPLICATION DEVICES SIMULTANEOUSLY

This invention relates to a method of controlling application devices, the method comprising the steps of
retrieving first documents from a first set of application devices by a server;
retrieving identification of a user by the server;
From the prior art, in the first step, it is known to retrieve documents to a server from application devices present. It is also known, in the second step, to retrieve information, by an id, to identify a user.

The present invention further relates to a system for controlling application devices comprising:
means for retrieving first documents from a first set of application devices by a server;
means for retrieving identification of a user by the server;
The present invention further relates to a computer system for performing the method.

The present invention further relates to a computer program product for performing the method.

It is known from the world of the Internet that Web users express their information needs explicitly by clicking on a hyperlink or by entering a textual query in an Hyper Text Markup Language (HTML) form field of a browser running on a client. This information is processed at the server side, and another HTML document that contains the results is sent back to the Web browser on the client side. The user interacts with only one document at a time, i.e. the user generally explicitly interacts with a single Extensible Markup Language (XML) browser running on a hardware platform of a device with access to the Internet.

WO 00/60488 discloses a method and an apparatus for controlling browser functionality using HTML and XML documents for an application specific control of a device. Browser functionality is configured according to user profile information specifying the authorization and preferences of the user. The user can modify each of the documents for the application specific control within the display of an application window for the device to be controlled. The documents for the application specific control are responsive to user activations of the browser.

However, the above prior art method involves the problem that when more electronic devices connected to a server by means of the Internet, and thereby controlled by the browser functionality of the server, need to have new parameters or setting, then by use of an entry field of the browser, for each device, the user has explicitly to key in a Uniform Resource Locator (URL) with parameter(s), to enter a textual command, or to click on a particular hyperlink to control a device. This is very time consuming when many devices have to be controlled. Additionally, it is further inconvenient that each time the user has to tell the server about his preferred setting or parameters of each of the devices he desires to control and or where he is now.

The above problem is solved by an implicit control of the application devices in that the said method is characterized in that the method further comprises the steps of
generating second documents by the server, each comprising an instruction, on the basis of at least a part of the retrieved identification of the user and at least a part of the first documents;
sending at least one of the second documents to each device of a second set of the application devices by the server; and
performing, for a given device of the second set, one instruction from at least one of the second documents received in the given device.

As a result of the first step the server generates other documents, having at least one instruction, on the basis of the identified user and at least a part of the first documents reflecting the status of the application devices, prior to any change.

As a result of the second step, the server simultaneously sends one or more documents to the application devices.

As a result of the third step, the application devices can simultaneously perform instruction of the received documents to change parameters and or settings. The changed parameters or settings reflect the preferred setting of the identified user.

By these three steps, the problem of the time consuming use of the entry field of the browser, the keying in of the URL with parameter(s), or the entering of the textual command, and or the clicking on the hyperlink in order to control each application device is solved in that the user should not explicitly click, type, etc. for each of the application devices surrounding him or her, as this setting and or these parameters were automatically transferred to the application devices when the user was also automatically identified by the server.

An advantage of the invention is that there is backward compatibility with older XML-based application devices like the Internet Radio FW-i 1000 Internet Radio Mini Shelf System of Philips. The Internet radio accepts to receive MPEG-1 Audio Layer-3 (MP3) play-lists at any time and from which it may play selected music of a user. The MP3 play-list in the form of one or more documents could be send to the Internet radio without any user interaction.

Another advantage of the invention is that there is also ensured backward compatibility with newer XML-based languages in that old application devices primarily understanding older XML-based languages may receive a subset of commands from the new XML-language in the old XML language. Further it may be possible that old application devices are updated by a software download to understand newer languages, e.g. any update or revision to XL-based languages or the like languages. For these reasons older application devices will not be obsolete when the present invention is implemented.

Another preferred embodiment of the invention is described in claim 2.

Hereby, user profile and context profile information may be used to reflect the user's interests and physical position. The user profile may comprise the user's preferred taste of music, movie, art and how these may be combined. Further, the user profile may comprise settings of light and or the settings and or parameters of other application devices in his or her home, or elsewhere, e.g. in a shopping centre, etc. Further the user profile may comprise or have the possibility of retrieving and or to being given information about the user's mood by means of the server.

The context profile information comprises information about the environment and or the application devices present in the particular environment of where the user may be at any moment.

By the information in these two steps, the problem associated with the user each time having to tell the server about his preferred setting for the devices surrounding him and or where he is, is solved in that the user profile and the context profile information reflect the user's preferred settings and or where the user is.

Other embodiments of the invention are described in claims 3 and 4.

Hereby the said application devices may be implicitly, simultaneously controlled by different documents in that a document such as at least one of Hyper Text Markup Language, Scalable Vector Graphics, Resource Description Framework and Extensible Markup Language (XML) is sent to the application device, before a possible another document or document type is modified or generated by the server.

The above problem is also solved by an implicit control of the application devices in that the system for controlling application devices is characterized in that the system further comprises:

means for generating second documents, each comprising an instruction, on the basis of at least a part of the retrieved identification of the user and at least a part of the first documents;

means for sending at least one of the second documents to each device of a second set of the application devices; and means for performing, for a given device of the second set, one instruction from at least one of the second documents received in the given device.

A preferred embodiment of the system according to the invention is described in claim 6.

The invention will be explained more fully below in connection with preferred embodiments and with reference to the drawings, in which.

Figure 1:
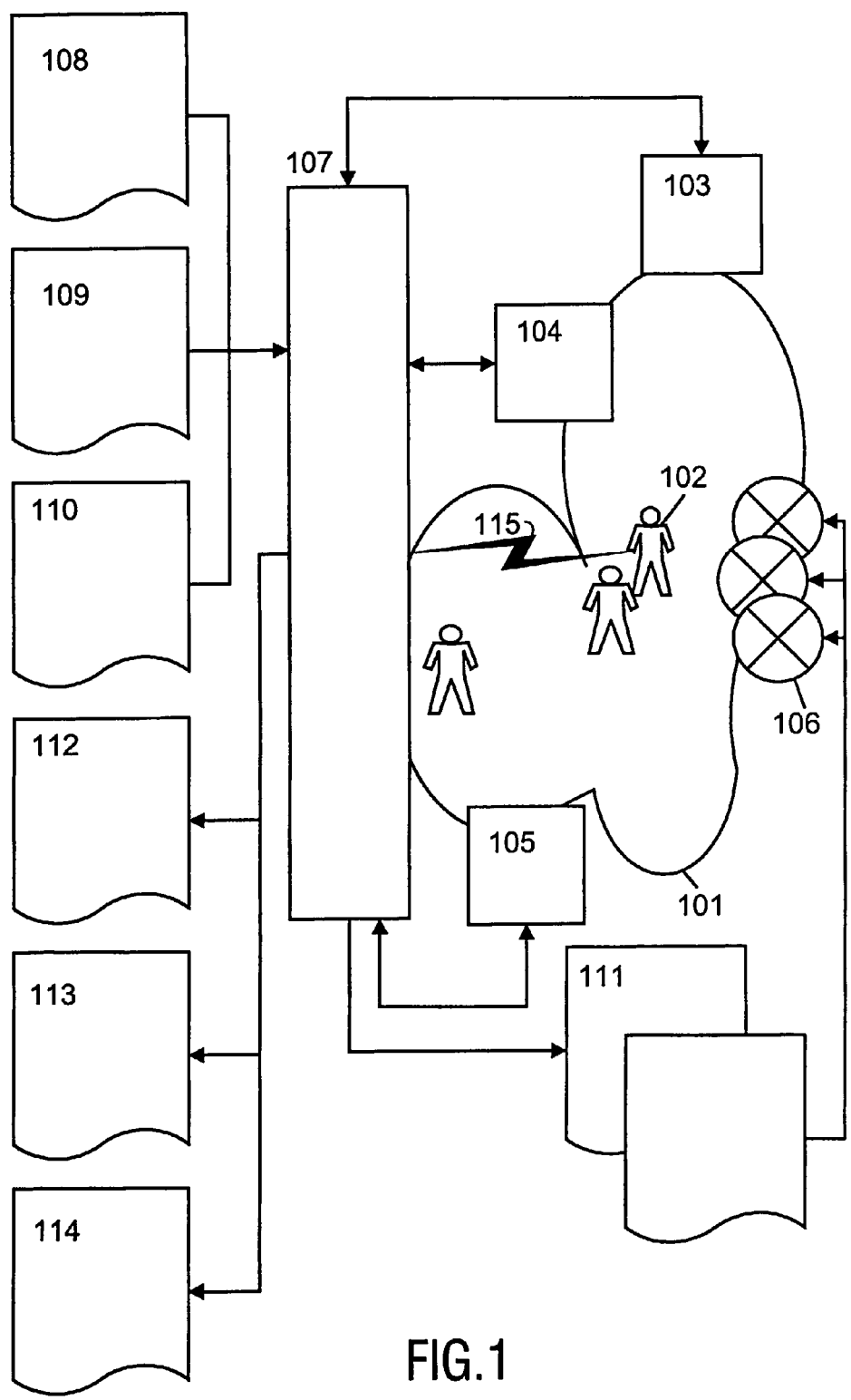
FIG. 1 shows an example of a responsive environment.

FIG. 1 shows an example of a responsive environment. In a first preferred embodiment of the invention, imagine that three persons are sitting in a living room. Two of them happen to be romantically engaged and the other is a friend who visits the couple. The room contains different application devices, such as reference numeral 103, a telephone, reference numeral 105, an audio player or radio, reference numeral 104, an electronic background wall (as a wide screen television) as well as several lamps, reference numeral 106. All these application devices or appliances may have an Internet connection or another network connection in order to be able to send information and to receive information from the Internet or another network in XML format. The audio player or radio may be playing dance music, the telephone may be on and the electronic background may show images or video clips that match the music. The lamps may be on. These application devices may continuously send information in the form of documents to reference numeral 107, a server on the Internet or another network that may analyse differences in reference numeral 101, the environment surrounding the home of reference numeral 102, the user or more users.

In the rest of this document, the term server may also be understood as a document adaptation server. Generally, the server may have or have received a given set of (first) input documents from the application devices comprising of user and context information. The server then uses it intelligence to compute and or to generate a (second) set of output documents, which are sent to the application devices. The server may use the context and the user profile contained in the first set of documents to calculate the content and a structure in the second set of documents, which may describe what each application device that participates in the user experience should do.

Now assume that the friend may go away. The server may recognize the change in the number of present persons and may start searching for documents that now better match the present users profiles and their context profile for all the application devices that surround the two users. The user profile may contain information about the users preferred music style, movie genre, preferred art and how these may be combined. Further the user profile may comprise settings of light in a continuous range of min to max power to the lamp. Further the user profile may comprise or have the possibility of retrieving and or be giving information about the user's mood by means of the server, it may be the mood of glad, in love, sad, angry, thoughtful, etc, and combinations thereof. The mood of the user may further be used to determine setting for the application devices, reference numerals 103, 104, 105 and 106 such as the audio player, the telephone, the electronic background and the lamps. Continuing the example, after the friend left the room, the server, reference numeral 107, may send, as showed by reference numeral 112, 113, 114 and 111, XML documents to each of the individual application devices to play romantic songs on the audio player, to show a movie of a panoramic view on the river Seine on a rainy day in Paris on the electronic background wall, to shut off the telephone for business calls and to dim the lights. Reference numeral 112 may be the XML document for the audio player, reference numeral 113 may be the XML document for the electronic background wall, reference numeral 114 may be the XML document for the telephone, and reference numeral 111 may be the XML documents for dimming the lights. Reference numeral 111 may primarily be the same XML document for each of the lamps, as the same function, dimming the light, may have to be performed in the same way for all the lamps. It can be seen from the example of responsive environment, that the server implicitly referenced multiple XML documents. Prior to sending the documents, reference numerals 111, 112, 113 and 114, other documents, as reference numerals 108, 109, 110, may have been retrieved from the corresponding application devices, the audio player, the wall and the telephone to reflect a status of these application devices prior to any adjustments of their settings. Even the light may be able to generate documents to reflect a status of the light prior to any adjustment of the light. As an example, it may be useful information from any of the lights, reference numerals 106, whether any of the bulbs in the light is dead or is still able to emit light. When the documents, reference numerals 112, 113, 114 and 111, were sent, these documents were then used implicitly to control the corresponding application device, i.e. audio player, wall, telephone and lights. The user should not explicitly click on a hyperlink or enter a textual query in an HTML form field of a browser for each of these application devices. In order to recognize or identify a user or users in the responsive environment or in any other surrounding, the server may retrieve identification of user(s). The user(s) may be recognized by means of an RF tag, a tag, a bar code, an IRIS scan, or by entering a personal identification to the server. Reference numeral 115 will be used in the FIGS. 1 through 4 to show the recognition or identification. It may be the case that more users, e.g. a family, a group, etc., are identified by means of reference numeral 115.

Figure 2:
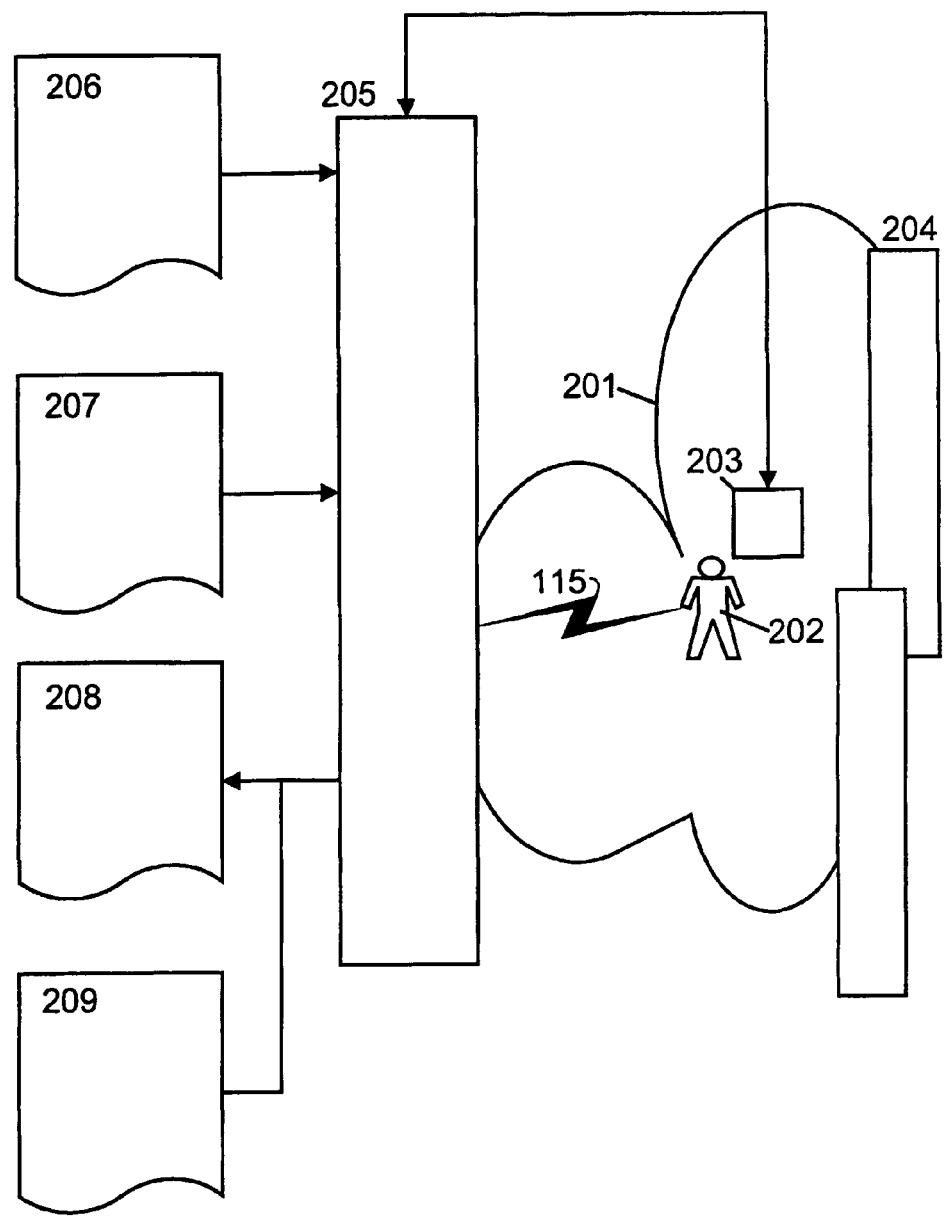
FIG. 2 shows an example of location-aware services.

FIG. 2 shows an example of location-aware services. In another preferred embodiment of the invention, imagine that a user, reference numeral 202 enters a shopping centre illustrated by reference numeral 201 as the environment surrounding the user, and the user does not know where he or she can buy a particular item at a good price in the neighborhood. The user may carry a Web tablet as an application device illustrated by reference numeral 203 with him, and the shopping centre may have one or more other application devices as electronic information panels illustrated by reference numeral 204. The Web tablet may be a wireless device with the display of the size of an A4 page, and as an example the web tablet may further be used to browse the Internet or browsing by means of another network connection. Application devices such as Mobile phones, Personal Digital Assistants (PDA), and all other wireless devices with a screen which may easily be carried by a user may be also be used in the following examples instead of the Web tablet, when the Web tablet is mentioned. The electronic information panels may show general information and information dedicated to a group or to a dedicated user. Both the Web tablet and the information panels can exchange data in the form of an XML document with the Internet or another network connection. The Web tablet may continuously sent information in XML, by means of the XML document, reference numeral 206 to reference numeral 205, the server about the user's location in the shopping centre and may be also information about where the user is located in the shopping centre, i.e. the exact coordinates in the shopping centre, which may be converted to a specific shop in the shopping centre. The server retrieves and recognizes the context profile, i.e. the user enters a shopping centre, and searches for XML documents that match the user profile: The server may send a personalized HTML document, reference numeral 208, that contains a list of interesting shops near the Web tablet; the same information may alternatively be sent through another generated document direct from reference numeral 205, the server, by means of a document, reference numeral 209, to reference numeral 204, the information panels that highlight these shops on a map displayed. This document, reference numeral 209, may be a newly generated SVG document, where SVG is the abbreviation for Scalable Vector Graphics, which is an XML-based standard for describing graphics in XML (as an example see in the URL http://www.w3.org/Graphics/SVG/Overview.htm8#more). The server, reference numeral 205, may first retrieve reference numeral 207, a SVG document retrieved from reference numeral 204, the information panels and thereafter generates reference numeral 209, a new SVG document. In the same way reference numeral 208, the HTML document, may be generated. In other words, prior to the sending of these documents to the information panels and the Web tablet, these documents were updated and or generated to reflect the context profile and the user profile. As the user walks through the shopping centre, both the contents in the form of the document sent to the Web tablet and sent to the information panels may change. From the example of location-aware services, it can again be seen that multiple documents, reference numerals 206, 207, 208 and 209, were referenced and or generated. The Web tablet and the server referenced multiple documents, i.e. the HTML documents and the SVG documents through the Internet. However, instead of using the Internet any other network with means for sending and receiving documents may have been used as well. The documents were generated, and then used to put information on the Web tablet and on the information panels prior to sending.

In this example, when documents were sent, these documents were then used implicitly to control the corresponding application devices, electronic information panels, etc. The user entering the shopping centre should not explicitly click on a hyperlink or enter a textual query in a form field of a browser on his Web tablet to retrieve personal information for each application devices; instead, documents were used implicitly to control the electronic information panels, etc. without any direct user interaction.

Figure 3:
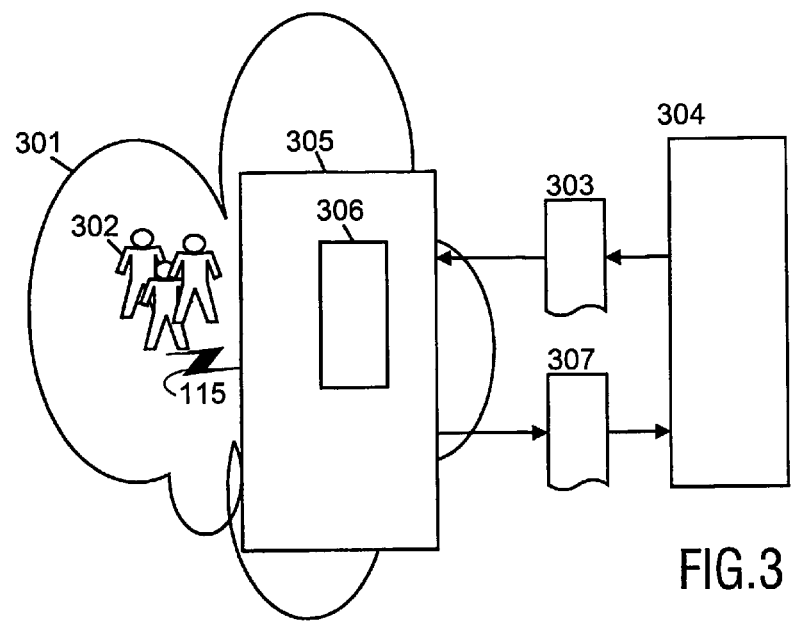
FIG. 3 shows an example of hypermedia portals.

FIG. 3 shows an example of hypermedia portals. In another preferred embodiment of the invention, a family may be sitting behind an application device such as a large flat-screen TV, reference numeral 305 with broadband Internet access or another broadband network access in a third scenario. The scenario, reference numeral 301, may be the family, reference numeral 302, sitting together in the living room. Extensions of the HTML language or more informative multimedia Web presentation languages may be used in documents; the document being retrieved and sent in this scenario may be a hypermedia document with interaction support, the hypermedia document may have brought TV-like content to the Web, and may turn the Web into one big repository of multimedia content and applications, many of which may be linked to each other via hypermedia portals. Such a hypermedia portal, reference numeral 306, in the application device, the TV, reference numeral 305, may be used for presentations of multimedia content and other applications. The successors of Web portals such as Yahoo and AOL (America On Line) may provide an easy menu driven remote controlled, TV-like user interface in order to create a personalized multimedia entertainment environment on the TV. By way of example the personalized multimedia entertainment may be movies and or television shows, and it may also be services such as on-line agendas, connectivity and e-commerce. Such a hypermedia portal may be seen as a combination of TV channels and Web portals. By interacting with the hypermedia portal, reference numeral 306, the family or the users may find themselves immersed in a blockbuster movie or engaged in an informative hypermedia Web site, watching video clips or buying items from an on-line shopping site, without having to switch devices or even to switch application like in the two foregoing examples, as a server such as the personalization server of FIG. 1, here with reference numeral 304, may implicitly reference multiple documents with reference numerals 303 and 307. The document with reference numeral 307 may be an XML, HTML or SVG document retrieved from the large flat-screen TV, reference numeral 305, in order give information to reference numeral 304, the server, what the total capabilities are of the large flat-screen TV and the hypermedia portal. The capabilities may be access to that type of media and or the type of files which may be presented, played, linked to etc. The information flowing the opposite way, the document generated with reference numeral 303 by the server may again be an XML, HTML or SVG document sent to the TV, reference numeral 305, in order to give information to the TV about the user's profile. The user's profile may be used by the TV to present media of a type and or a content preferred by the user or preferred by the family. The documents of reference numerals 303 and 307 my further be hypermedia documents, which may describe how multimedia content items (e.g. audio, images, video, text) are structured and hyper-linked to other documents. A hypermedia document may allow the user to click on media content items that bring the user to a new document, a new hypermedia document and or to another media content. The official World Wide Web Consortium (W3C) SMIL (Synchronized Multimedia Integration Language) standard may be an example of a hypermedia language for a hypermedia document. These documents may then be used to control the hypermedia portal to present different on-line information entertainment and or services, which is shown in that reference numeral 303, a document or documents, may be transferred between reference numeral 304, the server, to reference numeral 306, the hypermedia portal or browser of the TV, where the document is interpreted to show media content in the hypermedia browser running on the flat-screen TV hardware. The hypermedia portal of the TV may be described by a set of hypermedia documents, generated on the server, and displayed in the hypermedia browser running on the flat-screen TV hardware. Just like in the previous two figures, the hypermedia browser running on the flat-screen TV hardware may send information to the document server that may control or give the appropriate information back to the personalized hypermedia portal in the form of other documents. This server may retrieve, reconstruct, and or generate documents based on the user profiles and context profile descriptions. A set of hypermedia documents—such as reference numeral 303—describing the presentation of and interaction with the personalized multimedia content and applications may be sent back to the hypermedia browser running on the flat-screen TV hardware.

Figure 4:
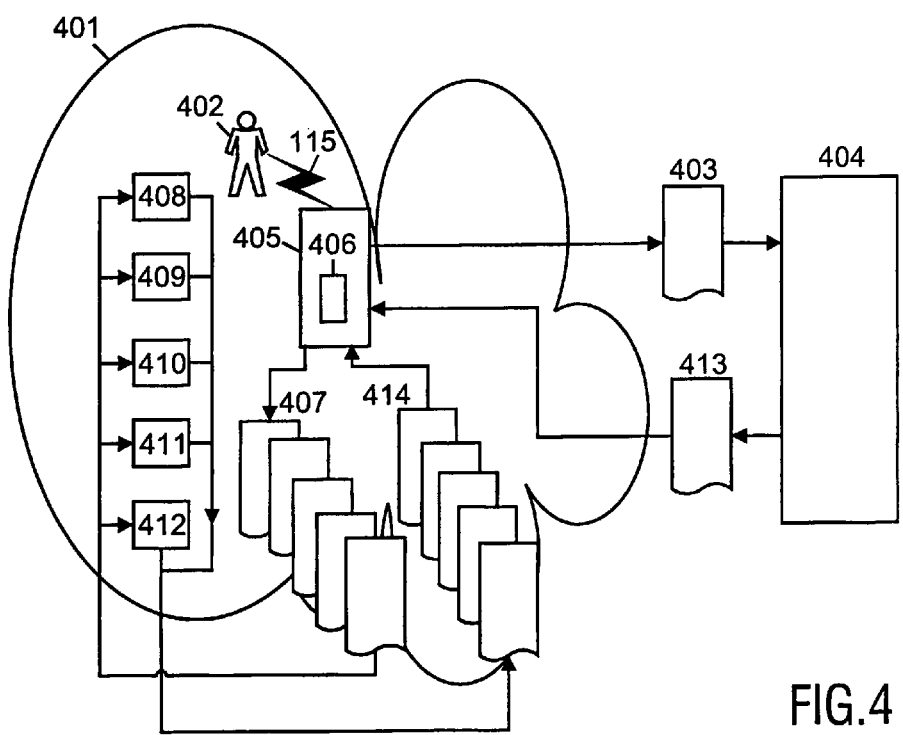
FIG. 4 shows an example of daily routines.

FIG. 4 shows an example of daily routines. In another preferred embodiment of the invention, FIG. 4 describes a situation, reference numeral 401, of a family or a user, reference numeral 402, waking up and preparing for the day. In the example the family or the user may be doing daily rituals such as having a shower, having breakfast while listening to music and planning the rest of the day. Document personalization technology by means of a server may be used to facilitate daily rituals such as rituals in waking up and having breakfast, etc. in this example of a preferred embodiment of the invention. Assume that an alarm clock, reference numeral 406, goes off, it may be the alarm clock in an application device like reference numeral 405, a Web tablet programmed to give a wake up call; the Web tablet may trig a schema script on a server, reference numeral 413, or send a document, reference numeral 403, to the server, and thereby make the Web tablet send another XML document, reference numeral 403 back to the server 404. The XML documents, reference numerals 403 and 413, may further comprise context profile, user profile information, etc. The context profile information in this scenario may comprise bath and living-room, morning and breakfast. The user profile information—based on identified users—may comprise information about all persons in the family, reference numeral 402, and their preferred interest in media content, soft-drink tastes such as coffee or tea, etc. By means of different documents, reference numeral 407, dedicated to reference numerals 408, 409, 410, 411, 412, different application devices, i.e. electronic controllable application devices with Internet access or other network access surrounding the user or users of the family, may be activated by sending the documents, reference numeral 407 to these application devices. By means of other different documents, reference numeral 414, dedicated to reference numerals 408, 409, 410, 411, 412, the application devices may send documents back with their corresponding status information to reference numeral 405, the Web tablet, prior to the receiving of documents from the Web tablet. A document may control an application device such as the bath, reference numeral 408 to a pre-adjusted temperature and or flow of water, and another document may relay an audio channel to another application device, a radio, reference numeral 409, in the bathroom. If the user leaves the bathroom, and shouts "breakfast!", a breakfast script in the Web tablet, reference numeral 405, may become active. The shouting of the user may be recognized by means of another application device, (not shown), like a microphone in the Web tablet. When the breakfast script is active in the Web tablet, the other application devices such as reference numeral 410, a TV, reference numeral 411, and a lamp in a living room may be switched on. The application devices may have been activated simultaneously by the sending of corresponding documents, reference numeral 407, to these devices, reference numerals 408, 409, 410, 411, at the same time. The documents of reference numeral 407 and 413 may have been updated or may have been generated to reflect the context profile and the user profile, prior to the sending of these documents. The documents may comprise instruction about dedicated setting for an application device. Examples of instructions for an application device may be instructions in the document for the TV and instructions in the document for the lamp: the TV may be tuned to the morning news, and the lamp may be set to 100 Watt. Meanwhile, an HTML document describing a personal agenda of the user may first be generated and then be loaded in the Web tablet on the kitchen table, and another electronic device, reference numeral 412, a coffee machine, may be activated via instructions in the received document to brew coffee. The personal agenda of the user loaded in the Web tablet may be used to show the planned and scheduled activities for the day and the evening for the family or the user. The coffee machine as well as the other application devices mentioned in this and the foregoing examples may be designed with access to the Internet or another network to enable these devices to receive information and instructions in the form of documents. The documents may comprise personalized setting and or instructions for each device for controlling the behavior of the device. Assume that a big family all like coffee in the morning, the document for the coffee machine may comprise the information with the instruction: 16 coups, black coffee with the temperature 88 degrees to be finished 6:30 in the morning.

Generally, the Web tablet may send information to the document server that may reply with generated documents, reference numeral 414, for the application devices surrounding a user or a family, or the Web tablet may itself generate documents, reference numeral 407 for the application devices in the scenario.

Figure 5:
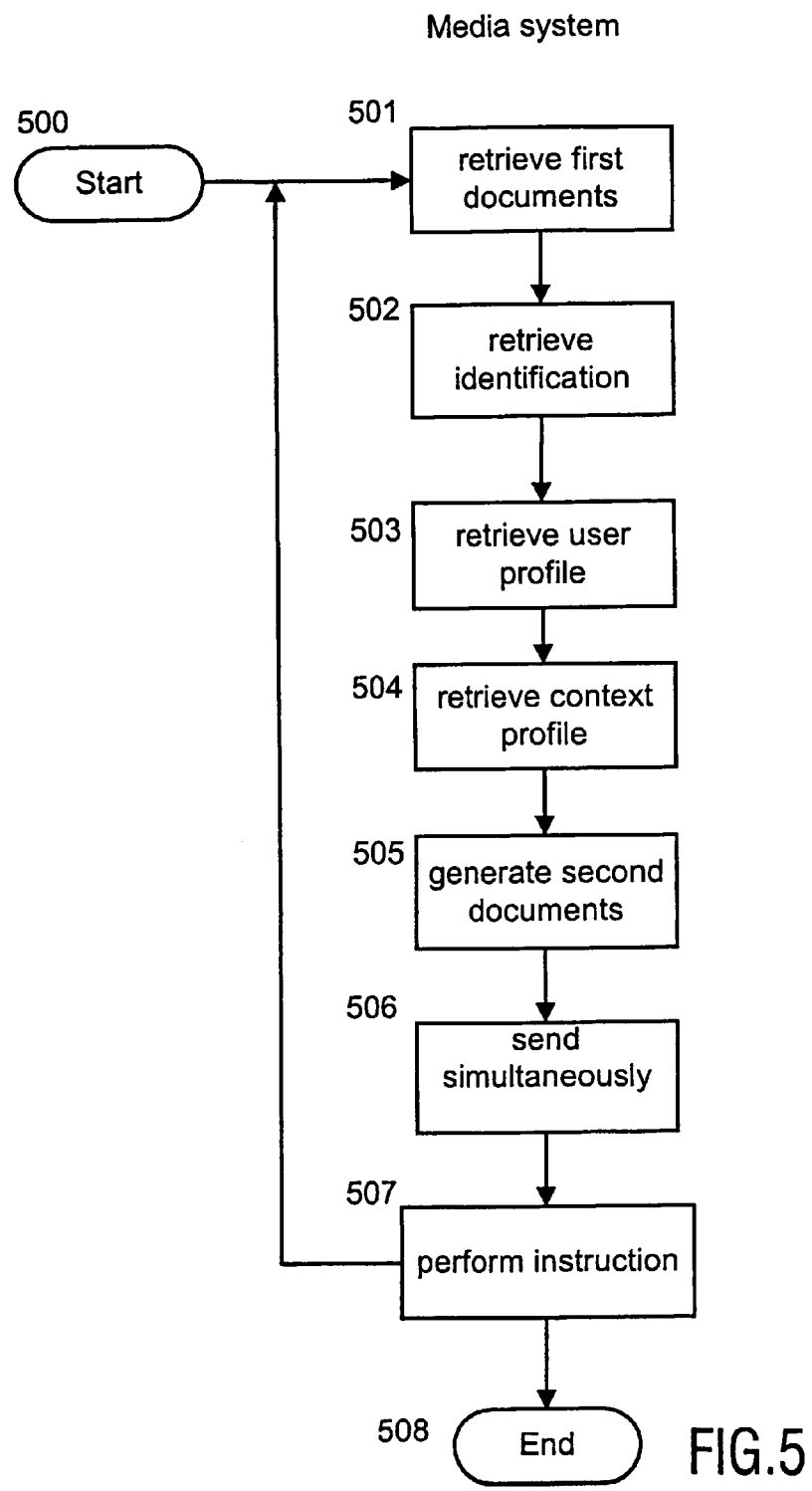
FIG. 5 shows a method of controlling application devices.

FIG. 5 shows a method of controlling application devices in another preferred embodiment of the invention. In step 500, the method is started. Generally when the application devices and the server are powered up, various initializations of variables, parameters, user profile information, context profile information, etc. are set to default values, if no usable values are present. After this starting point, the method proceeds to step 501.

In step 501, the server may retrieve first documents from a first set of application devices; as a result of a user entering a scenario, (how is explained in the next step), the present application devices may simultaneously send documents to a server on request or by themselves. Prior to the retrieving of documents, the server may send commands in the form of other documents to the application device to ask or to give order to send first documents about their status, and thereby retrieve corresponding documents from the present application devices. The documents retrieved by the server may such as in the example of FIG. 1 reflect the status of the application devices present. As a simple example, light may give information about whether any of the bulbs in the light is dead off or is still able to emit light, as another example, the audio player may give information about the sound level, in order to prevent the sound level at a future adjustment from being changed too fast, as this may be unpleasant to the user of a personalized environment.

In step 502, the server may retrieve identification of a user. Generally, reference numeral 115 of the foregoing Figures shows the identification of the user(s). The user entering a scenario may be recognized by means of a hand-carried application device such as a Web tablet, which may inform the server that a user has just entered the scenario with a particular identification. The user may be also be recognized by means of an RF tag, a tag, a bar code, IRIS scan, or by entering a personal identification to the server. On the basis of any of the means for identification, the server may retrieve user information. In may be the case that more users, e.g. a family, a group, etc., are identified.

In step 503 the server may retrieve user profile information based on the user identification. On the basis of one or more identified users, the server may retrieve user profile information from another server by means of the Internet or any other network, or from already present user profile information on the server itself. Even the hand-carried application device, the Web tablet, or any other hand-carried or portable application device may provide user profile information based on the user identification. When a user is surrounded by media player application devices such as DVD, VCR, radio, set-top boxes, etc. the user profile information may comprise information about the user's preferred music style, movie genre, art and how this particular items of information may be combined. As an example, the user profile may comprise preferred settings of bulbs in lamps in a living room. For members of a family, each having a user profile, the user profile of interest for breakfast may comprise the preferred interests in soft-drinks, coffee, tea, milkshake with or without sugar, etc. Further the user profile may comprise or have the possibility of retrieving information by means of the server about each of the user's moods, as the moods may affect the setting of the surrounding application devices.

In step 504 the server may retrieve context profile information relating to the surroundings of the user. Like in the previous examples the surroundings of the user may be in the living room, in the kitchen having breakfast etc. The user may have moved to other surroundings outside the home such as a shopping centre, an airport etc. In other words, the context profile information as retrieved by the server may comprise the environment and or the application devices present in the particular environment and or surroundings of where the user may be at any moment. From the information retrieved from the application devices present in a particular environment of the user, the server may derive the situation of the user, e.g. when the application devices present are a shower with electronic control of the temperature and the flow of water, a coffee-machine and or a toaster, the user is most likely at home in the kitchen or in the bathing room. An airport, a shopping-centre, etc, in principle any place, may have an identification code retrieved from the server about the context profile information of the user being present at the place. The identification code about the context profile information may continuously be sent to a server by means of the Internet or another network. The user in a scenario may have with him a hand-carried application device such as a Web tablet, which may inform the server that the user of the Web tablet has just entered a context with a particular context identification code.

In step 505 the server may generate second documents, each comprising an instruction, on the basis of at least a part of the retrieved identification of the user and at least a part of the first documents. In other words, on the server, on the basis of some of the retrieved first documents and in the basis of some of the retrieved identification of the user, and optionally further based on the user profile information and or based on the surroundings of the user; the server may generate second documents, each comprising an instruction. The number of second and first documents may differ, e.g. more first documents may have been retrieved than the number of the second documents than necessarily to generate second documents. The opposite may be also the case; the number of second documents may be higher than the number of first documents (in the case that some of the application devices failed to send first documents for technical reasons), and the server may determine that the surroundings to control may require information to all application devices present in the form of the second documents. Additionally the server may use extra intelligence and or other sources of information to generate second documents. The extra intelligence may be computing power provided outside the server, and other information sources refining the creation of second document may also be provided from another computer accessible from the server. The instruction or the instructions in the second documents may comprise settings and or parameters for application devices, in order to control the functionality of the devices, e.g. adjusting the volume of an application device such as a TV, a radio, a DVD player, etc. The instruction may be generated on the basis of the retrieved setting of these devices, the user profile, and the context profile as well as the mood of the user.

In step 506 the server may simultaneously send at least one of the second documents to each device of the second set of the application devices. In this step, all the necessary information may now be present on the server; the server may thereafter simultaneously send documents to each device of the second set of the application devices. In other words, at the same time all the application devices needing update of settings and or parameters, i.e. in the form of documents, may have documents sent to them from the server.

In step 507 any device of the second set of application devices may perform one instruction from at least one of the second documents. In this step, one or more of the application devices that received a document may perform one or more of the instructions of the received document. The document received may be dedicated to the application device, however, in the situation when the application devices are alike, they may receive the same document. It may further be the situation that non-like application devices received the same document, thereafter these application devices may use only the instruction or the instructions of the document usable for changing their parameters or settings. The instruction may comprise dedicated setting for the application device. The functionality of the application devices is affected simultaneously in that the documents sent to the application device were sent simultaneously from the server. In other words, a user entering a room surrounded by application devices, being recognized by means of some kind of identification code, may experience that the application devices present at the same time respond to him or her; i.e. in the living room, the user will at the same time experience adjustments of lights and playing of user preferred music on the DVD player of the user's hi-fi equipment. The user should not explicitly click on a hyperlink or enter a textual query in a form field of a browser on a server for each of the application devices in the living room to control these, as these settings were automatically applied to the application devices in that he or she entered the living room.

Normally, the method will start from the beginning again in step 501, as long as the server is running and at least one of the application devices is able to receive and send and or perform instructions. Otherwise, the method may terminate in step 508, however when just one of the application devices and the server are powered again, the method may proceed from step 501 again.

The mentioned server may also be understood as another powerful device with network or Internet access, the server may therefore be a powerful pc, both acting as a server and or as a client; the term server may also be a power full device primarily used to present media such as a Video Cassette Recorder, a set top box, a DVD player or any other power full electronic device that may present media information.

The distinction between the said server and the said application devices may be smaller than mentioned so far, in that both the server and the application devices may communicate with means of the Internet or any another network, and in principle they may be able to perform the same function as long as the electronic circuitry or the interface added to any of these devices can perform the desired functionality of the physical world, e.g. control a shower, control a coffee machine, etc. As a consequence of that, the server may be the Web tablet and vice versa.

A computer readable medium may be magnetic tape, optical disc, digital video disk (DVD), compact disc (CD or CD-ROM), mini-disc, hard disk, floppy disk, smart card, PCMCIA card, etc.

The invention claimed is:

1. A method of controlling an experience of a plurality of unique users surrounded by a plurality of application devices connected to a network, the method comprising acts of:
    a server connected to the network, the server automatically
        identifying one of the plurality of unique users and an environment surrounding the identified user;
        receiving status of the plurality of application devices in the environment;
        retrieving a profile of the identified one user of the plurality of unique users and a context profile relating to the environment;
        generating at least one instruction for two or more of the plurality of application devices participating in the experience based at least in part on the identification of the identified one user of the plurality of unique users and at least in part on the received status of the plurality of application devices in the environment; and
    each of the two or more application devices participating in the experience receiving and upon receipt performing the at least one instruction.

2. The method according to claim 1, further comprising acts of:
    the one or more unique users carrying at least one hand-carried application device including one of a Web tablet, a RF tag, and a bar code;
    providing in the environment at least one information reader selected from IRIS scan and a device for accepting entry of a user identification,
    wherein the act of identifying uses information received from at least one of the at least one hand-carried application device and the at least one information reader.

3. The method according to claim 1, wherein the identification of the identified one user of the plurality of unique users and the received status of the plurality of application devices in the environment are coded in at least one of Hyper Text Markup Language, Scalable Vector Graphics, Resource Description Framework and Extensible Markup Language.

4. The method according to claim 1, wherein the plurality of application devices comprises at least one of Web tablet, set-top box, VCR, TV, PDA, lamp, coffee machine, radio, telephone, background wall, DVD player and electronic information panel.

5. A system for controlling an experience of a plurality of unique users surrounded by a plurality of application devices, the system comprising:
    a network connecting at least several application devices participating in the experience; and
    a server configured to automatically
        identify a one of the plurality of unique users and an environment surrounding the first user;
        receive status of the plurality of application devices in the environment,
        retrieve a profile of the identified one user of the plurality of unique users and a context profile relating to the environment, and
        generate at least one instruction for two or more of the plurality of application devices participating in the experience based at least in part on the identification of the identified one user of the plurality of unique users and at least in part on the received status of the plurality of application devices in the environment,
    wherein each of the two or more application devices participating in the experience is configured to receive and upon receipt perform the at least one instruction.

6. The system, according to claim 5, further comprising:
    on the one or more unique users, at least one hand-carried application device including one of a Web tablet, a RF tag, and a bar code; and
    in the environment, at least one information reader selected from IRIS scan and a device for accepting entry of a user identification,
    wherein at least one of the at least one hand-carried application device and the at least one information reader providing information for identifying the one user of the plurality of unique users.

7. The system, according to claim 5, wherein the system is a computer system.

8. A computer program product comprising program code stored on a computer readable non-transitory medium for when executed by a computing device performing a method of controlling an experience of a plurality of unique users surrounded by a plurality of application devices connected to a network, the method comprising acts of automatically:
    identifying one of the plurality of unique users and an environment surrounding the identified user;
    receiving status of a plurality of application devices in the environment;
    retrieving a profile of the identified one user of the plurality of unique users and a context profile relating to the environment;
    generating at least one instruction for two or more of the plurality of application devices participating in the experience based at least in part on the identification of the identified one user of the plurality of unique users and at least in part on the received status of the plurality of application devices in the environment; and
    each of the two or more application devices participating in the experience receiving and upon receipt performing the at least one instruction.

9. The method according to claim 2, wherein the identification of the one user of the plurality of unique users and the received status of the plurality of application devices in the environment are coded in at least one of Hyper Text Markup Language, Scalable Vector Graphics, Resource Description Framework and Extensible Markup Language.

10. The method according to claim 9, wherein the plurality of application devices comprises at least one of Web tablet, set-top box, VCR, TV, PDA, lamp, coffee machine, radio, telephone, background wall, DVD player and electronic information panel.

11. The system according to claim 5, wherein the plurality of application devices comprises at least one of Web tablet, set-top box, VCR, TV, PDA, lamp, coffee machine, radio, telephone, background wall, DVD player and electronic information panel.

12. A system for controlling an experience of a plurality of unique users surrounded by a plurality applications executing on a plurality of respective devices and communicating over a network, the system comprising:
- a server configured to automatically
  - identify one of the plurality of unique users and an environment surrounding the identified user;
  - receive status of the plurality of applications in the environment;
  - retrieve a profile of the identified one user of the plurality of unique users and a context profile relating to the environment;
  - autonomously generate at least one instruction for two or more of the plurality of applications participating in the experience based at least in part on the identification of the identified one user of the plurality of unique users and at least in part on the received status of the plurality of applications in the environment; and
  - each of the two or more applications participating in the experience receiving and upon receipt performing the at least one instruction.

13. The system of claim 12, further comprising:
- on the one or more unique users, at least one hand-carried application device including one of a Web tablet, a RF tag, and a bar code; and
- in the environment, at least one information reader selected from IRIS scan and a device for accepting entry of a user identification,
- wherein at least one of the at least one hand-carried application device and the at least one information reader providing information for identifying the one user of the plurality of unique users.

14. The system of claim 13, wherein the retrieved identification and received status of the plurality of application devices in the environment are coded in at least one of Hyper Text Markup Language, Scalable Vector Graphics, Resource Description Framework and Extensible Markup Language.

15. The system of claim 12, wherein the plurality of application devices comprises at least one of Web tablet, set-top box, VCR, TV, PDA, lamp, coffee machine, radio, telephone, background wall, DVD player and electronic information panel.

16. The system of claim 13, wherein the plurality of application devices comprises at least one of Web tablet, set-top box, VCR, TV, PDA, lamp, coffee machine, radio, telephone, background wall, DVD player and electronic information panel.

17. The system of claim 12, wherein the identification of the one user of the plurality of unique users and the received status of the plurality of application devices in the environment are coded in at least one of Hyper Text Markup Language, Scalable Vector Graphics, Resource Description Framework and Extensible Markup Language.

18. The system of claim 17, wherein the plurality of application devices comprises at least one of Web tablet, set-top box, VCR, TV, PDA, lamp, coffee machine, radio, telephone, background wall, DVD player and electronic information panel.

19. The server of claim 12, wherein the plurality of application devices comprises at least one of Web tablet, set-top box, VCR, TV, PDA, lamp, coffee machine, radio, telephone, background wall, DVD player and electronic information panel.

20. A server for controlling an experience of a plurality of unique users surrounded by a plurality of application devices connected to a network, the server comprising:
- a processor configured to automatically
  - identify a one of the plurality of unique users and an environment surrounding the identified user;
  - receive status of a plurality of application devices in the environment,
  - retrieve a profile of the identified one user of the plurality of unique users and a context profile relating to the environment,
  - generate at least one instruction for two or more of the plurality of application devices participating in the experience based at least in part on the identification of the identified one user of the plurality of unique users and at least in part on the received status of the plurality of application devices in the environment, and
- each of the two or more application devices participating in the experience receiving and upon receipt performing the at least one instruction, said at least one instruction changing parameters and/or settings of the application device to reflect one or more settings preferred by the identified one user of the plurality of unique users.

* * * * *